United States Patent
Cuomo, Jr. et al.

(10) Patent No.: US 11,997,159 B2
(45) Date of Patent: May 28, 2024

(54) PROACTIVE PLACEMENT OF VIRTUALIZED COMPUTING RESOURCES AND TUNING OF NETWORK RESOURCES BASED ON SEASONAL VARIATIONS

(71) Applicant: MICROSOFT TECHNOLOGY LICENSING, LLC, Redmond, WA (US)

(72) Inventors: Daniel Frederick Cuomo, Jr., Woodinville, WA (US); Harish Srinivasan, Redmond, WA (US); Paul Anirban, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/131,681

(22) Filed: Dec. 22, 2020

(65) Prior Publication Data
US 2022/0201066 A1    Jun. 23, 2022

(51) Int. Cl.
*H04L 67/10* (2022.01)
*H04L 43/16* (2022.01)
*H04L 49/9005* (2022.01)

(52) U.S. Cl.
CPC .............. *H04L 67/10* (2013.01); *H04L 43/16* (2013.01); *H04L 49/9005* (2013.01)

(58) Field of Classification Search
CPC ...... H04L 67/10; H04L 43/16; H04L 49/9005
USPC ........................................................ 709/223
See application file for complete search history.

(56) References Cited

U.S. PATENT DOCUMENTS

| | | | |
|---|---|---|---|
| 9,571,426 B2* | 2/2017 | Agarwal | H04L 49/30 |
| 9,886,302 B2* | 2/2018 | Tsirkin | G06F 9/505 |
| 9,935,854 B2 | 4/2018 | Kuan et al. | |
| 10,511,542 B2 | 12/2019 | Srinivasan et al. | |
| 10,602,383 B1 | 3/2020 | Horton et al. | |
| 11,218,394 B1* | 1/2022 | Plenderleith | H04L 41/0816 |
| 11,528,187 B1* | 12/2022 | Volpe | H04L 47/24 |
| 2014/0059111 A1* | 2/2014 | Veeraiyan | H04L 67/10 709/201 |
| 2014/0082616 A1* | 3/2014 | Kurita | G06F 9/455 718/1 |
| 2014/0219287 A1 | 8/2014 | Birke et al. | |
| 2016/0259659 A1 | 9/2016 | Tang | |

(Continued)

OTHER PUBLICATIONS

Bouacida, et al., "Practical and Dynamic Buffer Sizing Using LearnQueue", In Journal of IEEE Transactions on Mobile Computing vol. 18 Issue 8, Aug. 1, 2019, pp. 1885-1897.

(Continued)

*Primary Examiner* — Nicholas R Taylor
*Assistant Examiner* — Chong G Kim
(74) *Attorney, Agent, or Firm* — Han Gim; Newport IP, LLC

(57) ABSTRACT

Techniques are disclosed for configuring network device resources and determining locality of virtual machines in a virtual network of a cloud computing environment. Usage data for computing resources in the computing network is collected. Based on the collected usage data, a time-based usage profile for the computing resources in the computing network is determined. A periodic component in the time-based usage profile is determined. Based on the periodic component, distribution of VMs is determined or the buffer size of network devices is configured.

19 Claims, 7 Drawing Sheets

(56) References Cited

U.S. PATENT DOCUMENTS

| | | | |
|---|---|---|---|
| 2017/0063704 A1* | 3/2017 | Krinsky | H04W 4/029 |
| 2017/0126528 A1* | 5/2017 | Padmanabhan | H04L 43/20 |
| 2018/0212885 A1* | 7/2018 | Contavalli | H04L 47/27 |
| 2018/0246756 A1* | 8/2018 | Abali | G06F 9/544 |
| 2018/0302457 A1* | 10/2018 | Hassan | H04L 65/80 |
| 2019/0317817 A1 | 10/2019 | Brown et al. | |
| 2019/0372866 A1* | 12/2019 | Ganguli | H04L 12/4625 |
| 2019/0386913 A1* | 12/2019 | Wei | H04L 47/125 |
| 2020/0028787 A1 | 1/2020 | Mehra et al. | |
| 2021/0029580 A1* | 1/2021 | Gupta | H04W 24/08 |
| 2021/0081312 A1* | 3/2021 | Coury | G06F 13/1689 |
| 2021/0410029 A1* | 12/2021 | Farag | H04L 43/0894 |
| 2022/0124039 A1* | 4/2022 | Chandra | H04L 47/22 |

OTHER PUBLICATIONS

Xiao, et al., "Dynamic Resource Allocation Using Virtual Machines for Cloud Computing Environment", In Journal of IEEE Transactions on Parallel and Distributed Systems vol. 24 Issue 6, Jun. 2013, pp. 1107-1117.
Gao, et al., "Machine Learning based Workload Prediction in Cloud Computing", In Proceedings of 29th International Conference on Computer Communications and Networks, Aug. 3, 2020, 9 Pages.
"International Search Report and Written Opinion Issued in PCT Application No. PCT/US21/060910", dated Mar. 31, 2022, 11 Pages. (MS# 409142-WO-PCT).

* cited by examiner

PROACTIVE PLACEMENT OF VIRTUALIZED COMPUTING RESOURCES AND TUNING OF NETWORK RESOURCES BASED ON SEASONAL VARIATIONS

BACKGROUND

A data center is a facility that houses computer systems and various networking, storage, and other related components. Data centers may, for example, provide computing services to businesses and individuals as a remote computing service or provide "software as a service" (e.g., cloud computing). To facilitate efficient utilization of data center resources, virtualization technologies allow a physical computing device to host one or more virtual machines (VM) that appear and operate as independent computer devices to a connected user. The data center can create, maintain or delete virtual machines in a dynamic manner.

When data center resources are inefficiently allocated and configured, poor network performance may result, resulting in lost data, or users being unable to provide quality services to their downstream customers, which may result in lost revenue and customer dissatisfaction. Overallocation of resources, on the other hand, can lead to cost inefficiencies. It is with respect to these considerations and others that the disclosure made herein is presented.

SUMMARY

The disclosed embodiments describe technologies for forecasting optimal virtual machine (VM) locality based on seasonal network load across clustered systems. Characterization of seasonality on a per VM-basis allows for optimal arrangement of VMs across available cluster nodes while reducing network throughput contention. Additionally, the disclosed embodiments provide for proactive tuning of network device resources based on seasonal multivariate indications of resource exhaustion. Current implementations are static in nature (i.e., the setting remains the same until manual intervention occurs), in part because the network device must be reset in order to enact these changes.

Virtual machines frequently follow seasonal network throughput patterns due to the nature of hosted applications. When applications with similar seasonality are migrated to the same hypervisor host, they can contend, and can exhaust the available network bandwidth on the host. The hypervisor typically has no inherent awareness of the seasonality of these VMs and therefore one or more of the VMs may be starved or severely limited in throughput, resulting in poor performance. Moreover, seasonality is difficult to identify as the applications and seasonality are customer and environment specific.

Techniques are described for forecasting seasonal network bandwidth oversubscription where hosts need more bandwidth than they have available to satisfy the application requirements by tracking the historical network requirements of a VM. In one implementation, performance counters such as network bytes/sec or ingress/egress for all virtual network interface cards (vNICs) on the same VM are tracked. The data can be used to track the throughput on a per application basis in order to forecast seasonal oversubscription. Based on the analysis, identified issues may be auto-remediated by live migrating VM(s) to another system that has available capacity. An application programming interface (API) can be provided that allows other kernel or user mode applications to track status ensuring throughput requirements can be met. This can enable a more efficiently utilized hypervisor, reduce the number of servers needed to satisfy the workloads, and facilitate troubleshooting when needed.

Methods and systems are further provided for correlating seasonal indications of improperly sized buffers on a network device such as a network adapter, and proactively tuning the configuration of the network device to reduce seasonal resource inefficiency and packet loss. An improperly sized buffer can result in excessive packet loss and/or system resource consumption. This can have widespread adverse effects, particularly across cluster nodes. Network devices typically provide indications of such conditions that can be detected through performance counters. These conditions can occur as a result of inconsistent application network patterns and in public or private cloud scenarios where the administrator does not have the visibility to identify the seasonal patterns requiring the tuning of the network device to meet the demands of the applications running on them. Dynamic detection of such seasonal conditions can be used to reduce system inefficiencies. Although the size of the buffers can be maximized to reduce the likelihood of packet loss, this would waste system resources during periods of low activity.

The disclosed embodiments provide for monitoring data such as vNIC bytes/per sec, NIC low resource indications, and packet retransmits to track the usage of the system resources across multiple levels of seasonality (for example: hour-per-day, day-of-week) to identify "hotspots" in the data and forecast future needs. Once a forecast is generated and a predetermined threshold is reached, the system can take proactive action. Such actions can include, for example, increasing or decreasing the network device buffer resources, or if insufficient resources exist on the host, migrating the application to a host with sufficient resources. As a result, host efficiency can be improved, network congestion can be reduced since retransmits are not occurring at frequent intervals, and network performance of the application (VM/container) can be improved.

The described techniques can allow for maintaining efficient use of computing resources such as processor cycles, memory, network bandwidth, and power, while reducing potential loss of data and services and downtime, resulting in impact to end users.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1:
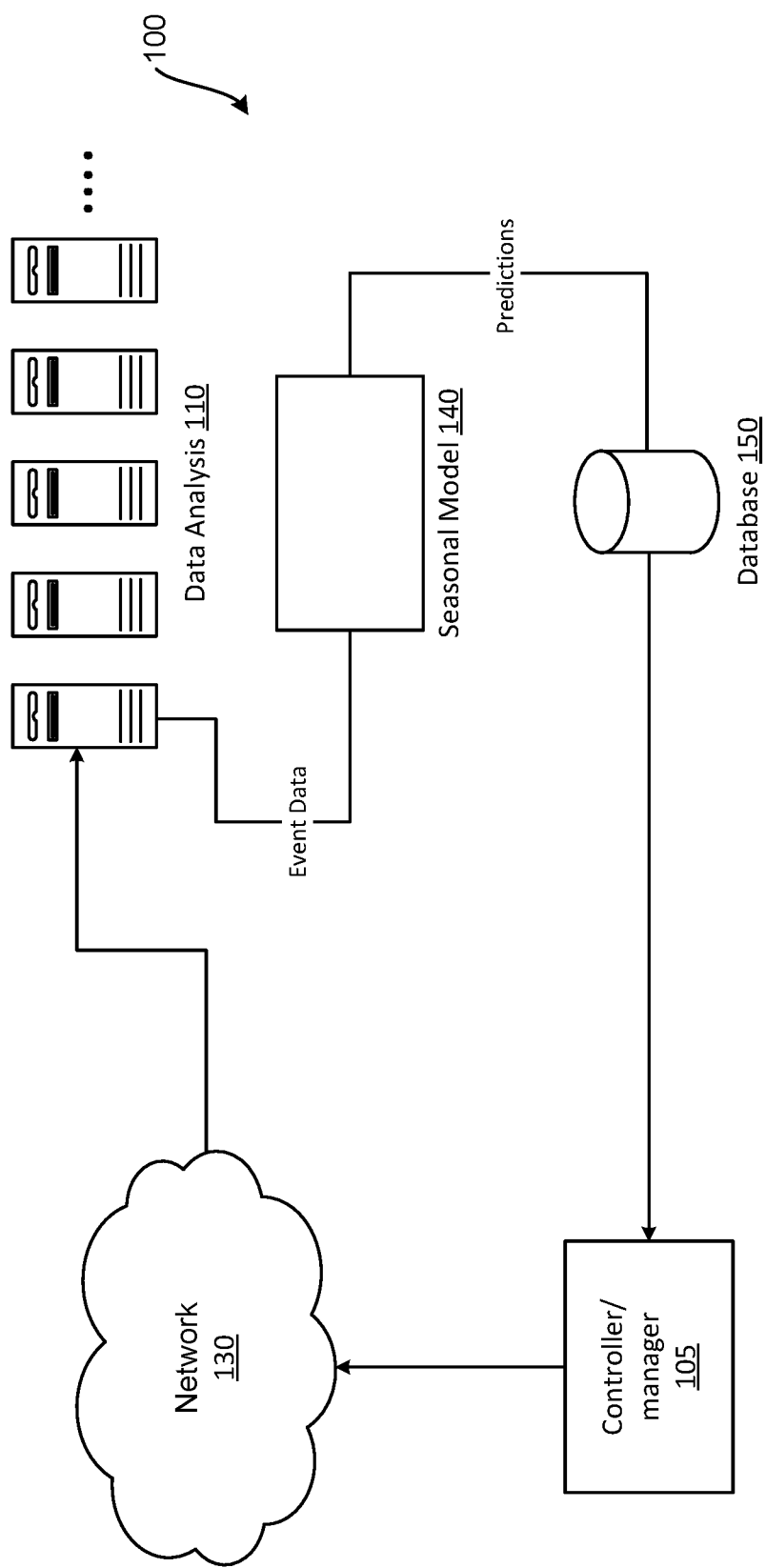
FIG. 1 is a diagram illustrating a system for detecting seasonal variations in accordance with the present disclosure.

The disclosed embodiments describe technologies for forecasting optimum virtual machine (VM) locality based on seasonal network load across clustered systems, and proactive tuning of network device resources based on seasonal multivariate indications of resource exhaustion. The described techniques may allow data centers to more effectively adhere to operational objectives and at the same time improve operating efficiencies.

In many data centers, issues such as exhaustion of available network bandwidth and improperly sized buffers on a network device may cause delays or drops of data packets. Such issues can have a negative impact on performance and the user experience.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that the subject matter described herein may be practiced on or in conjunction with other computer system configurations beyond those described herein, including multiprocessor systems. The embodiments described herein may also be practiced in distributed computing environments, where tasks are performed by remote processing devices that are linked through a communications network. In a distributed computing environment, program modules may be located in both local and remote memory storage devices.

In various embodiments, technologies are disclosed for forecasting optimum virtual machine locality based on seasonal network load across clustered systems. In various embodiments, technologies are also disclosed for proactive tuning of network device (e.g., network adapter) resources based on seasonal multivariate indications of resource exhaustion.

Referring to the appended drawings, in which like numerals represent like elements throughout the several FIGURES, aspects of various technologies for mitigating misconfiguration issues will be described. In the following detailed description, references are made to the accompanying drawings that form a part hereof, and which are shown by way of illustration specific configurations or examples.

In some embodiments, methods are described for application of machine learning to analyze network throughput seasonality on a per VM-basis to optimally arrange virtual machines across available cluster nodes while reducing network throughput contention.

Virtual machines frequently follow seasonal network throughput patterns due to the nature of applications contained in them. For example, a file server hosting user profiles or virtual desktop infrastructure (VDI) systems may see a large increase in traffic as customers begin work in the morning. Once these logins occur, however, the throughput of those VMs dissipate while other applications may not display the same seasonality. For example, a SQL server (or other application) may have different seasonal patterns based on the customer's usage.

When applications with similar seasonality are migrated to the same hypervisor host, they can contend and can sometimes exhaust the available network bandwidth on the host. The hypervisor has no inherent awareness of the seasonality of these VMs and therefore one or more of the VMs may be starved or severely limited in throughput resulting in poor performance.

Moreover, such seasonality is difficult to predict as the applications and seasonality are customer and environment specific. Accordingly, in some embodiments a machine learning system may be implemented to analyze the seasonality of virtual machines. A trained machine learning model may be used to forecast seasonal network bandwidth oversubscription where hosts need more bandwidth than they have available to satisfy the application requirements by tracking the historical network requirements of VMs on the host.

Some embodiments may leverage inherent performance counters that are available on operating systems, track the throughput on a per application basis, and forecast seasonal oversubscription. This can enable a more efficiently utilized hypervisor and reduce the number of servers needed to satisfy the workloads, administrator troubleshooting, and the like. The machine learning model can be trained to predict upcoming network bandwidth oversubscription in a cluster of systems if no action is taken. Based on the analysis, the issue may be auto-remediated by live migrating VM(s) to another system that has available capacity. The model can also provide an API which allows other kernel or user mode applications to be informed of potential oversubscriptions, ensuring throughput requirements can be met.

For example, a storage network rebuild is an uncommon act and can greatly reduce the amount of available bandwidth. By predicting upcoming requirements, the rebuild process can be executed at a slower pace until the seasonal requirements have dissipated or seasonally active applications are migrated away from the rebuilding nodes.

In some embodiments, machine learning can be implemented to correlate seasonal indications of improperly sized buffers on a network device, and proactively tune the configuration of the network device to reduce seasonal resource inefficiency and packet loss. An improperly sized buffer can result in excessive packet loss and/or system resource consumption. This can have widespread adverse effects, particularly across cluster nodes. Current implementations can be static in nature. For example, settings can remain the same until manual intervention occurs, in part because the network device must be reset in order to enact changes. However, by analyzing the workloads, intelligent actions can be initiated (e.g., migrate workloads to another cluster node, perform resets in advance of the need, migrate workloads back, etc.). Network device typically provide indications of such conditions that can be detected by the operating system through performance counters.

The above described conditions can occur as a result of inconsistent application network patterns and in public or private cloud scenarios where the administrator does not have the visibility to identify the seasonal patterns requiring the tuning of the network device to meet the demands on the applications running on them. In various embodiments disclosed herein, machine learning can be implemented to reduce the inefficient use of system resources by tuning parameters such as network adapter buffer size. In an example, an administrator can simply maximize the size of the buffers to reduce the likelihood of packet loss. However, this would waste system resources during periods of low activity. The use of a learning system can allow for dynamic adaptation to changing customer environment to efficiently utilize system resources as network scenarios change.

In an embodiment, a trained machine learning model can receive multiple variables such as vmNIC bytes/per sec, NIC low resource indications, and number of retransmits, and track the usage of the system resources across multiple levels of seasonality (for example: hour-per-day, day-of-week) to identify "hotspots" in the data and forecast future needs. A forecast can be generated and when a threshold is reached, the system can initiate a proactive mitigation action. For example, the network interface card (NIC) buffer resources can be increased or decreased, or if the host has insufficient resources, the application can be migrated to a host that has sufficient available resources.

By forecasting seasonal variations, host efficiency can be improved, network congestion can be reduced since retransmits are not occurring at such a frequent interval, and the application (VM/container) can have improved network performance. The disclosed technologies can enable more accurate utilization, which in turn can enable, for example, more cost-efficient resource management. Technical benefits other than those specifically mentioned herein might also be realized through implementations of the disclosed technologies.

A number of performance counters and other system and network parameters may be used to train the machine learning model. For example, to implement efficient virtual machine locality, the network bytes/sec per virtual NIC (vNIC) network bytes/sec can be tracked and subtracted from the amount that the host is using. The remaining amount is the delta available capacity for that host. By forecasting the needs on that host, if it is determined that there is insufficient capacity to accommodate the forecasted needs, virtual resources can be migrated as needed. Similarly, for sizing of network device configurations such as buffer size, the queue size and the number of packets in a particular bucket can be tracked.

In some embodiments, a host computing device may execute an agent that is configured to track various performance counters for virtual machines, host vNICs, containers, physical NICs, and the like. The agent may send the tracked data to a storage service for storage and analysis.

Additionally, the analysis of the performance data can be performance at various levels of granularity. For example, a machine learning model that analyze data across a cluster of nodes or multiple clusters. A localized machine learning model can be run on a smaller grouping of hosts or a single host so that local variations can be accounted for. For example, some seasonal variations may be more pronounced on a local host as compared to the cluster.

Models for forecasting seasonal variations can have at least two components. A trend component can model the basic trend of a metric over time. A periodic or seasonal component can model predictable changes based on the natural period of the metric (e.g., daily startup). Some models may include a noise component that accounts for expected variations in the data Some models may also include an event-based component that represents effects due to the impact of an asynchronous or anomalous event. The event-based component can be used for various types of sudden events such as a customer reconfiguration.

In an embodiment, a forecasting model for resource allocation may be represented by:

$$TS_t = T_t + S_t + E_t + N_t$$

T may represent the trend component of the model. S may represent the seasonal component. E may represent an event-based component. N may represent the noise component. t may represent the time.

FIG. 1 is a computing system architecture diagram showing an overview of a system disclosed herein for a modeling system, according to one embodiment disclosed herein. As shown in FIG. 1, a modeling system 100 (which might also be referred to herein as a "forecasting system" or as a "prediction system") may be configured to model system parameters based upon various event data ("event data") generated by data analysis components 110 (which might be referred to individually as an "data analysis component 110" or collectively as the "data analysis components 110").

The data analysis components 110 may, for example, include, but are not limited to, physical computing devices such as server computers or other types of hosts, associated hardware components (e.g., memory and mass storage devices), and networking components (e.g., routers, switches, and cables). The data analysis components 110 can also include software, such as operating systems, applications, and containers, network services, virtual components, such as virtual disks, virtual networks, and virtual machines. The database 150 can include data, such as a database, or a database shard (i.e., a partition of a database). The modeling system 100 may be used to predict a metric that may be used to update system parameters. In some configurations, a seasonal model 140 may be implemented. The seasonal model 140 may also be referred to as a learning model 140 or a machine learning model 140 or periodic model 140. As shown in FIG. 1, the seasonal model 140 can generate predictions (which might be referred to herein simply as a "prediction") based on data extracted from monitored information. The predictions may be acted upon by controller/manager 105 that may be configured to tune settings for network devices and/or cause one or more virtual machines to be migrated.

Figure 2:
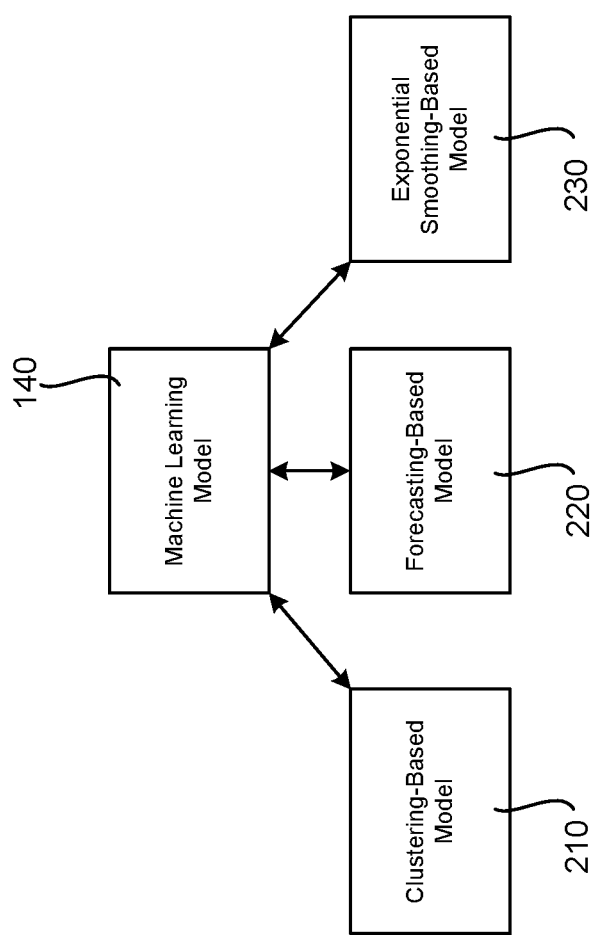
FIG. 2 is a diagram illustrating machine learning models in accordance with the present disclosure.

As shown in FIG. 2, the machine learning model 140 may also, or alternately, utilize unsupervised machine learning techniques to predict resources including, but not limited to, a clustering-based model 310, a forecasting-based model 320, a smoothing-based model 330, or another type of unsupervised machine learning model.

In some embodiments, the tracking data may be analyzed to identify trends and patterns related to various system parameters and determine which parameters may influence resource utilization. In one embodiment, the machine learning model 140 may incorporate a classification function that may be configured to determine which parameters are relevant for a particular objective. The classification function may, for example, continuously learn which parameters are relevant to a various potential outcomes. In some embodiments, supervised learning may be incorporated where the machine learning model may classify observations made from various parameters.

Figure 3:
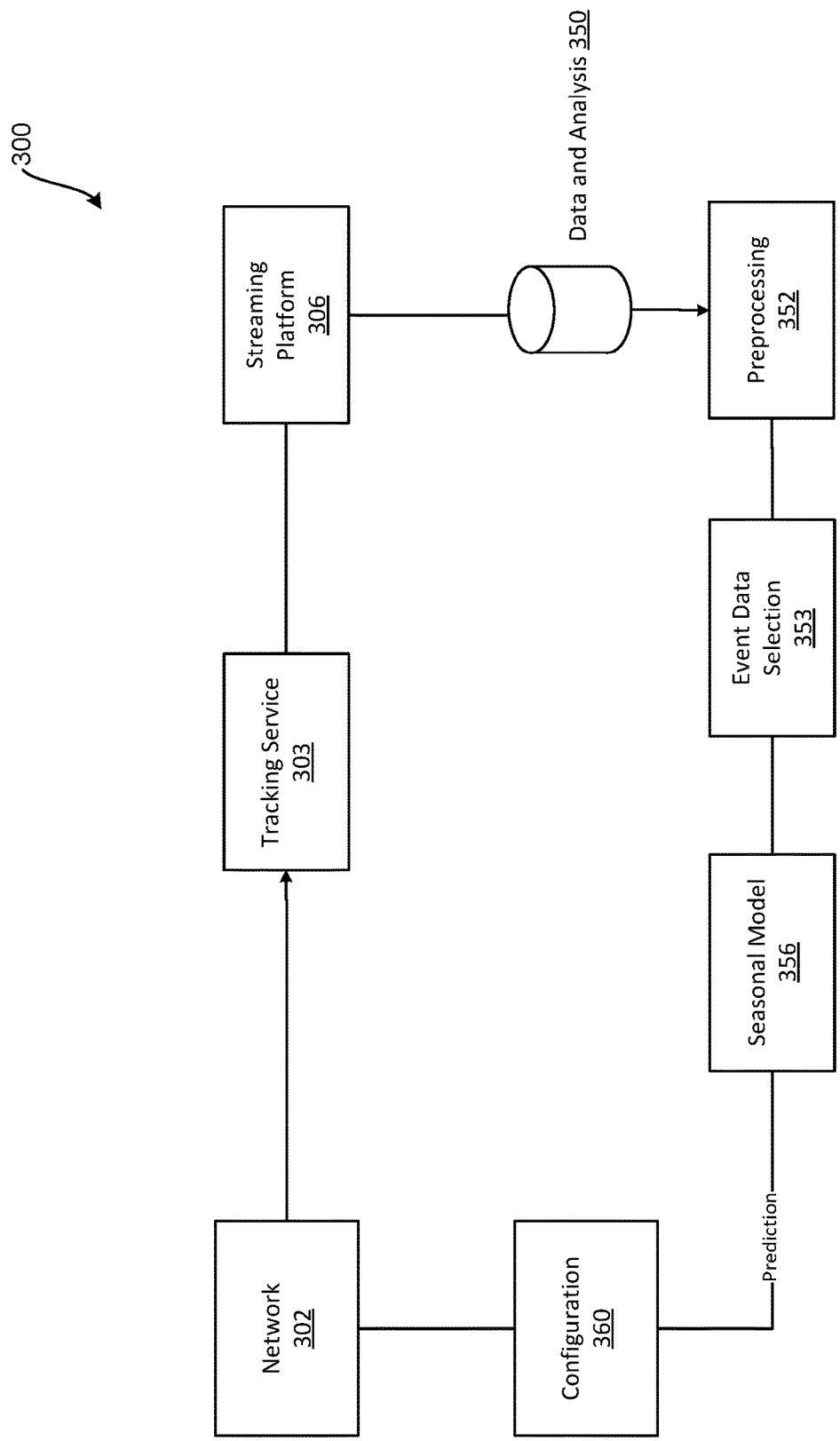
FIG. 3 is a diagram illustrating a system for detecting seasonal variations in accordance with the present disclosure.

FIG. 3 is a computing system architecture diagram showing an overview of a system disclosed herein for seasonal adjustment of resources, according to one embodiment. As shown in FIG. 3, seasonal adjustment system 300 may be configured to predict metrics based upon tracking data generated by tracking service 303 and received from network 302.

The tracking service 303 may send selected tracking data to a streaming platform 306. Data streams may be provided to a data storage component and analysis component 350. The data and analysis component 350 may provide data for a preprocessing component 352 that may be configured to process the stored data. The processed data may be provided to an event data selection component 353 that may be configured to select event data and properties. The processed data may be provided to seasonal model 356 that may use the data and properties to update the model based on the event data, generate a prediction, and send the prediction to configuration system 360. Configuration system 360 may cause the updating of one or more system configurations such as a buffer size of an adapter or migration of virtual machines in network 302.

Figure 4:
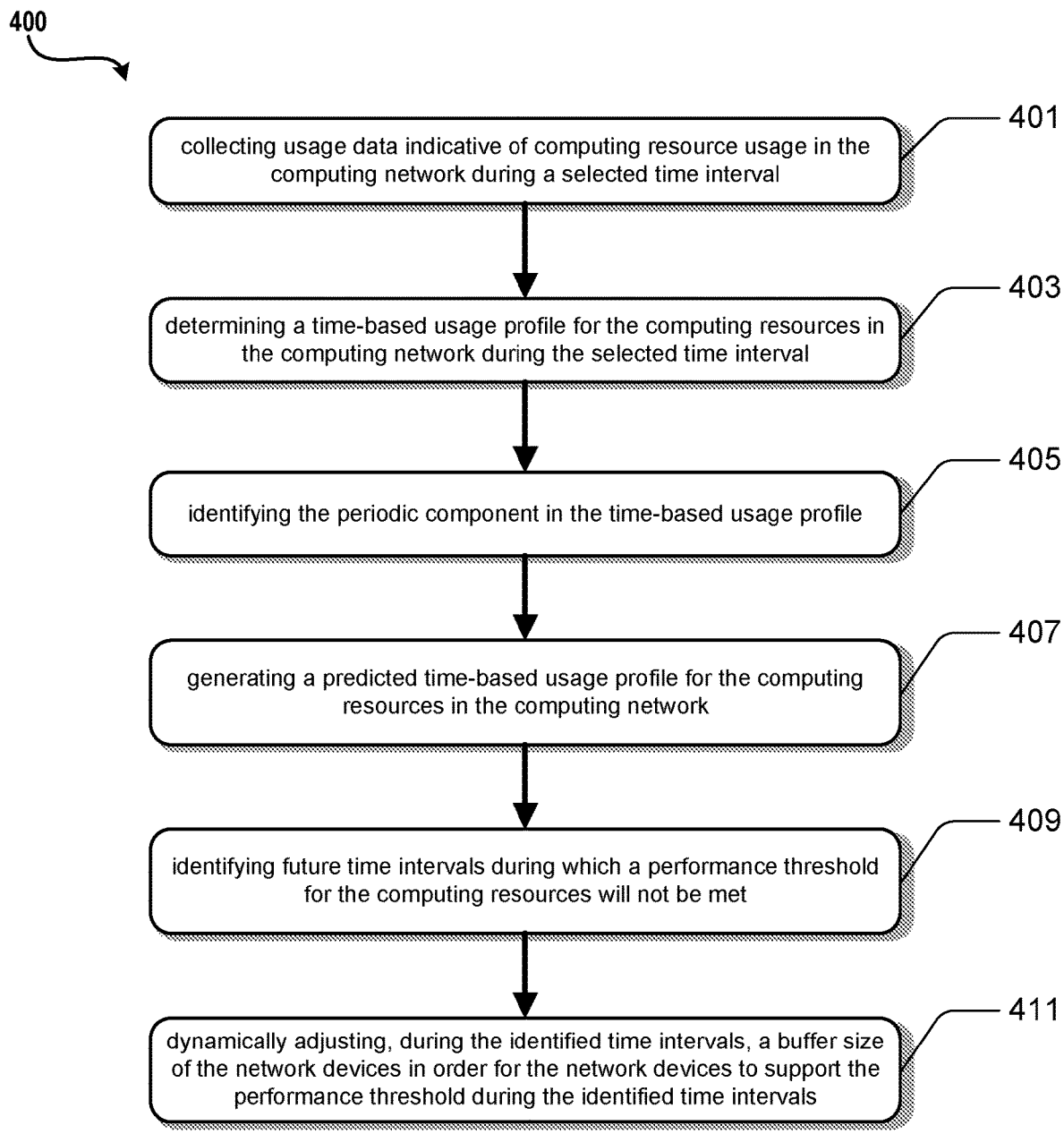
FIG. 4 is a flowchart depicting an example procedure in accordance with the present disclosure.

Turning now to FIG. 4, illustrated is an example operational procedure for configuring network devices in a computing network of a cloud computing environment in accordance with the present disclosure. The computing network comprises a plurality of computing devices hosting virtual machines and a plurality of the network devices. The network devices are communicatively coupled to the computing devices.

It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a computing device, it can be appreciated that this routine can be performed on any computing system which may include a number of computers working in concert to perform the operations disclosed herein.

Thus, it should be appreciated that the logical operations described herein are implemented (1) as a sequence of computer implemented acts or program modules running on a computing system such as those described herein and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Referring to FIG. 4, operation 401 illustrates collecting usage data indicative of computing resource usage in the computing network during a selected time interval.

Operation 401 may be followed by operation 403. Operation 403 illustrates based on the collected usage data, determining a time-based usage profile for the computing resources in the computing network during the selected time interval, the time-based usage profile having a trend component and a periodic component.

Operation 403 may be followed by operation 405. Operation 405 illustrates identifying the periodic component in the time-based usage profile.

Operation 405 may be followed by operation 407. Operation 407 illustrates based on the periodic component, generating a predicted time-based usage profile for the computing resources in the computing network.

Operation 407 may be followed by operation 409. Operation 409 illustrates based on the predicted time-based usage profile, identifying future time intervals during which a performance threshold for the computing resources will not be met.

Operation 409 may be followed by operation 411. Operation 411 illustrates dynamically adjusting, during the identified time intervals, a buffer size of the network devices in order for the network devices to support the performance threshold during the identified time intervals.

In an embodiment, the predicted time-based usage profile is further generated based on a system-wide model and a localized model.

In an embodiment, the usage data comprises performance counters.

In an embodiment, the method further comprises generating a notification when the periodic component is identified.

In an embodiment, the periodic component is identified by a machine learning model.

In an embodiment, the performance counters comprise one or more of network interface bytes received/sec, network interface bytes sent/sec, low resource receive indications/sec, low resource received packets/sec, or segments retransmitted/sec.

In an embodiment, the periodic component is determined over a selected hour/day or day/week.

In an embodiment, the method further comprises migrating one or more virtual machines to a host with sufficient computing resources to accommodate the predicted time-based usage profile.

In an embodiment, the machine learning model comprises a trend component.

Figure 5:
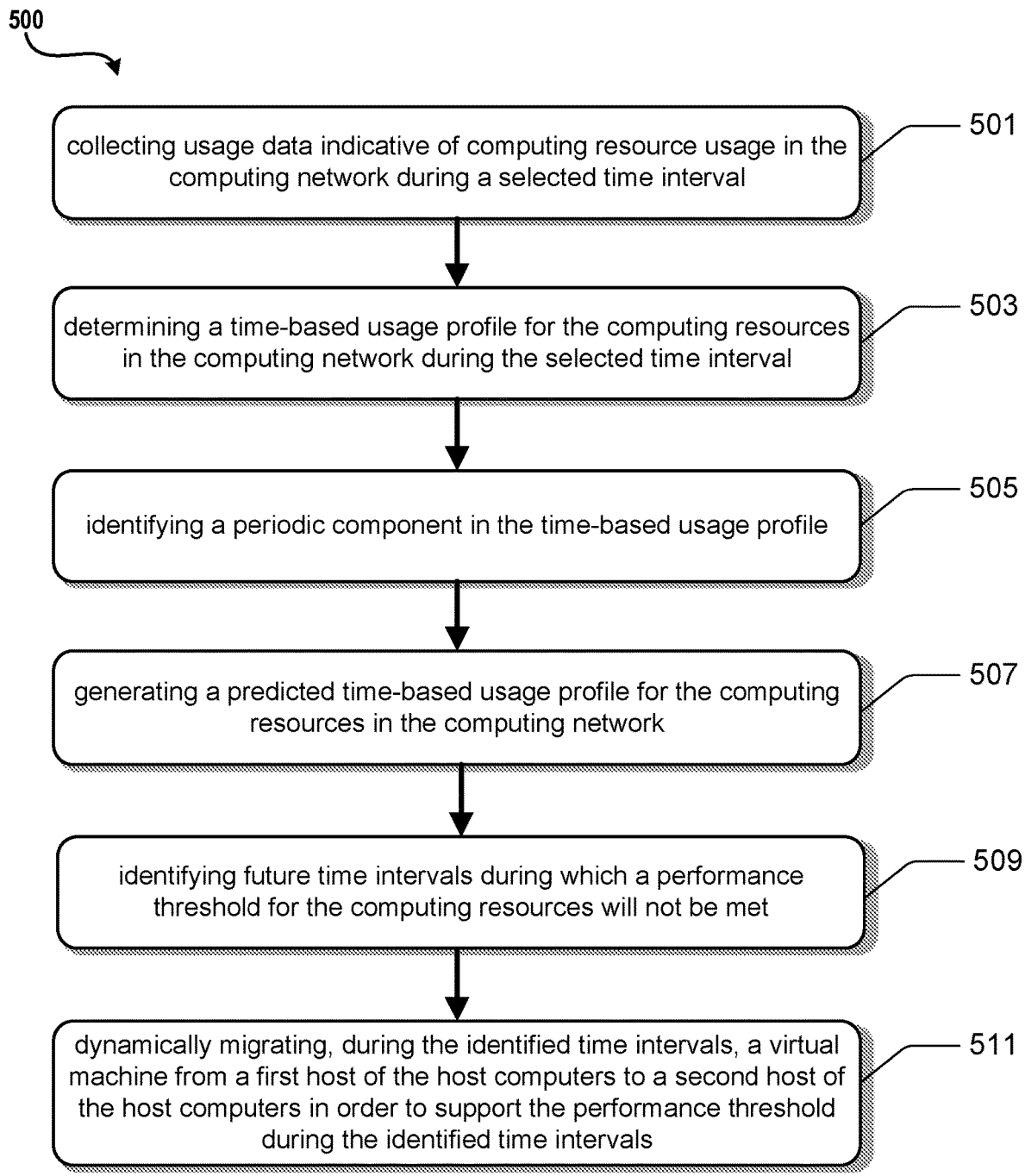
FIG. 5 is a flowchart depicting an example procedure in accordance with the present disclosure.

Referring to FIG. 5, illustrated is an example operational procedure for determining locality of virtual machines in a virtual network of a cloud computing environment, the virtual network comprising a plurality of host computers. Referring to FIG. 5, operation 501 illustrates collecting usage data indicative of computing resource usage in the computing network during a selected time interval.

Operation 501 may be followed by operation 503. Operation 503 illustrates based on the collected usage data, determining a time-based usage profile for the computing resources in the computing network during the selected time interval.

Operation 503 may be followed by operation 505. Operation 505 illustrates identifying a periodic component in the time-based usage profile.

Operation 505 may be followed by operation 507. Operation 507 illustrates based on the periodic component, generating a predicted time-based usage profile for the computing resources in the computing network.

Operation 507 may be followed by operation 509. Operation 509 illustrates based on the predicted time-based usage profile, identifying future time intervals during which a performance threshold for the computing resources will not be met.

Operation 509 may be followed by operation 511. Operation 511 illustrates dynamically migrating, during the identified time intervals, a virtual machine from a first host of the host computers to a second host of the host computers in order to support the performance threshold during the identified time intervals.

In an embodiment, the usage data comprises performance counters.

In an embodiment, the performance counters comprise one or more of network interface bytes received/sec, network interface bytes sent/sec, low resource receive indications/sec, low resource received packets/sec, or segments retransmitted/sec.

In an embodiment, the periodic component is identified by a machine learning model.

Figure 6:
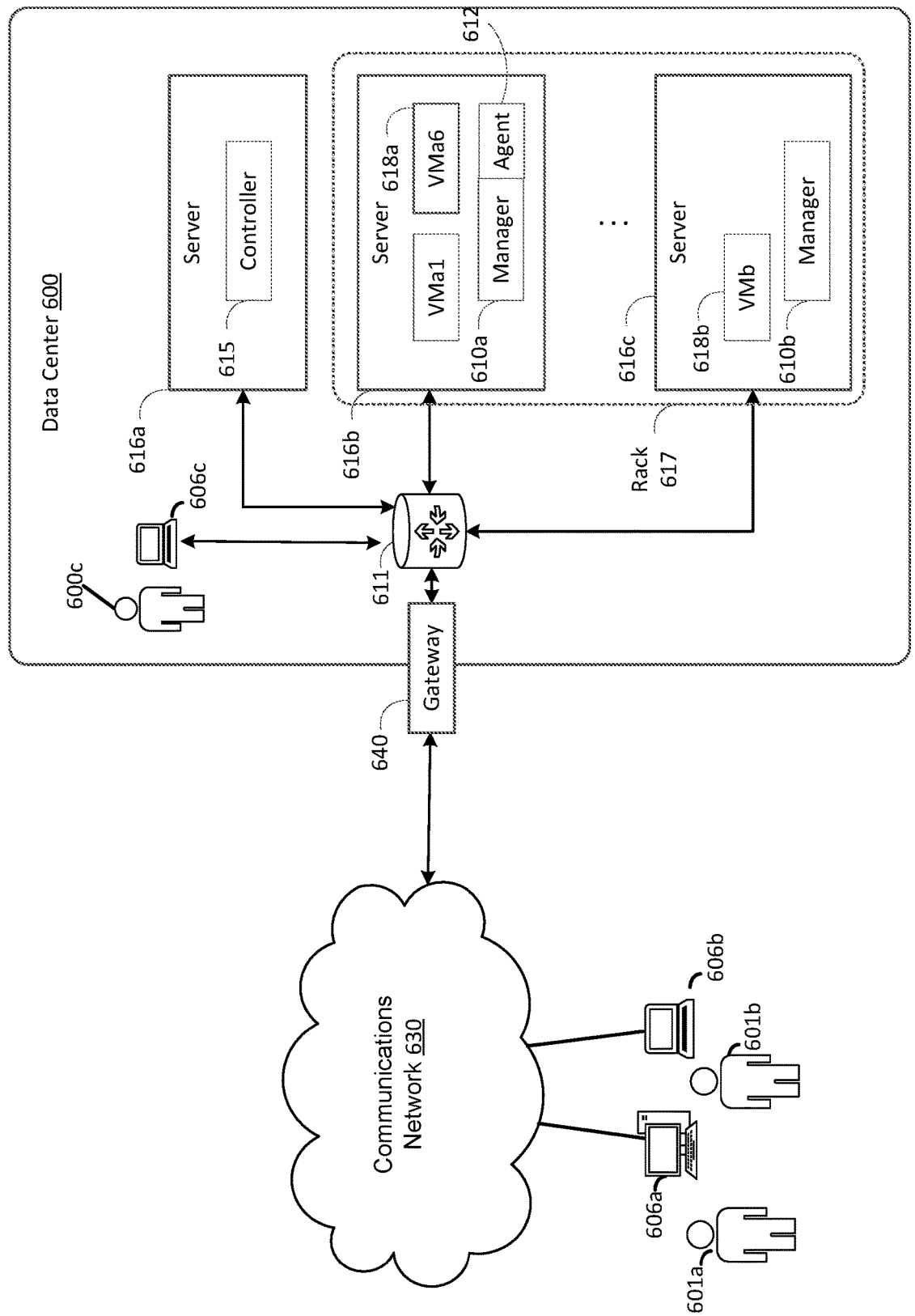
FIG. 6 is a diagram illustrating a data center for providing virtualized resources in accordance with the present disclosure.

In an embodiment, the periodic component is determined over a selected hour/day or day/week FIG. 6 illustrates an example computing environment in which the embodiments described herein may be implemented. FIG. 6 illustrates a data center 600 that configured to provide computing resources to users 601a, 601b, or 601c (which may be referred herein singularly as "a user 601" or in the plural as "the users 601") via user computers 606a, 606b, and 606c (which may be referred herein singularly as "a computer 606" or in the plural as "the computers 606") via a communications network 630. The computing resources provided by the data center 600 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 600 may include servers 616a, 616b, and 616c (which may be referred to herein singularly as "a server 616" or in the plural as "the servers 616") that provide computing resources available as virtual machines 618a and 618b (which may be referred to herein singularly as "a virtual machine 618" or in the plural as "the virtual machines 618"). The virtual machines 618 may be configured to execute applications such as Web servers, application servers, media servers, database servers, and the like. Other resources that may be provided include data storage resources (not shown on FIG. 6) and may include file storage devices, block storage devices, and the like. Servers 616 may also execute functions that manage and control allocation of resources in the data center, such as a controller 615. Controller 615 may be a fabric controller or another type of program configured to manage the allocation of virtual machines on servers 616.

Referring to FIG. 6, communications network 630 may, for example, be a publicly accessible network of linked networks and may be operated by various entities, such as the Internet. In other embodiments, communications network 630 may be a private network, such as a corporate network that is wholly or partially inaccessible to the public.

Communications network 630 may provide access to computers 606. Computers 606 may be computers utilized by users 600. Computer 606a, 606b or 606c may be a server, a desktop or laptop personal computer, a tablet computer, a smartphone, a set-top box, or any other computing device capable of accessing data center 600. User computer 606a or 606b may connect directly to the Internet (e.g., via a cable modem). User computer 606c may be internal to the data center 600 and may connect directly to the resources in the data center 600 via internal networks. Although only three user computers 606a, 606b, and 606c are depicted, it should be appreciated that there may be multiple user computers.

Computers 606 may also be utilized to configure aspects of the computing resources provided by data center 600. For example, data center 600 may provide a Web interface through which aspects of its operation may be configured through the use of a Web browser application program executing on user computer 606. Alternatively, a stand-alone application program executing on user computer 606 may be used to access an application programming interface (API) exposed by data center 600 for performing the configuration operations.

Servers 616 may be configured to provide the computing resources described above. One or more of the servers 616 may be configured to execute a manager 160a or 160b (which may be referred herein singularly as "a manager 160" or in the plural as "the managers 160") configured to execute the virtual machines. The managers 160 may be a virtual machine monitor (virtual machine), fabric controller, or another type of program configured to enable the execution of virtual machines 618 on servers 616, for example.

It should be appreciated that although the embodiments disclosed above are discussed in the context of virtual machines, other types of implementations can be utilized with the concepts and technologies disclosed herein. For example, the embodiments disclosed herein might also be utilized with computing systems that do not utilize virtual machines.

In the example data center 600 shown in FIG. 6, a router 611 may be utilized to interconnect the servers 616a and 616b. Router 611 may also be connected to gateway 640, which is connected to communications network 630. Router 611 may manage communications within networks in data center 600, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 600 described in FIG. 6 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Networks established by or on behalf of a user to provide one or more services (such as various types of cloud-based computing or storage) accessible via the Internet and/or other networks to a distributed set of clients may be referred to as a service provider. Such a network may include one or more data centers such as data center 100 illustrated in FIG. 1, which are configured to host physical and/or virtualized computer servers, storage devices, networking equipment and the like, that may be used to implement and distribute the infrastructure and services offered by the service provider.

Figure 7:
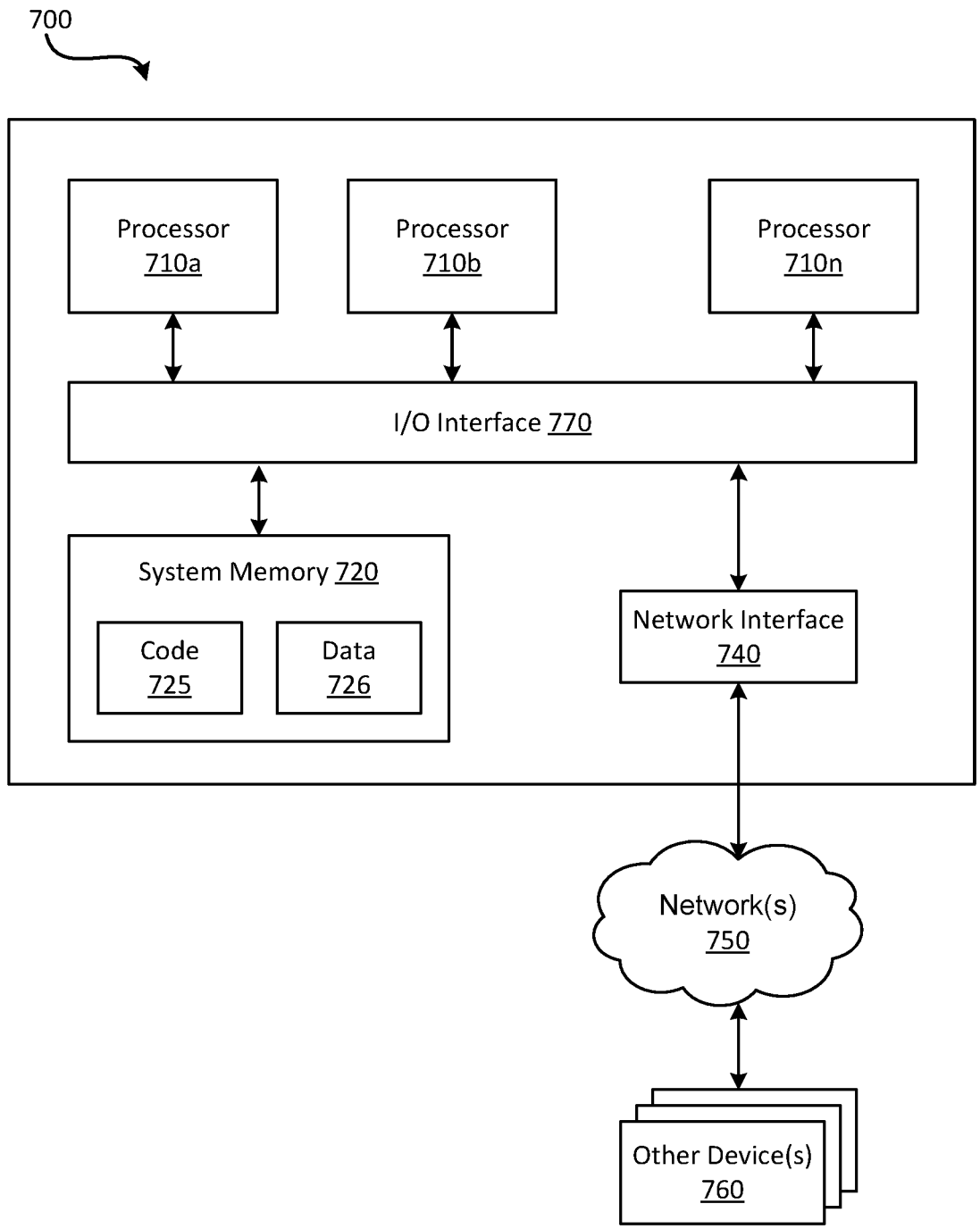
FIG. 7 is an example computing device in accordance with the present disclosure.

In some embodiments, a server that implements a portion or all of one or more of the technologies described herein, including the techniques to implement the capturing of network traffic may include a general-purpose computer system that includes or is configured to access one or more computer-accessible media. FIG. 7 illustrates such a general-purpose computing device 700. In the illustrated embodiment, computing device 700 includes one or more processors 710a, 710b, and/or 710n (which may be referred herein singularly as "a processor 710" or in the plural as "the processors 710") coupled to a system memory 720 via an input/output (I/O) interface 770. Computing device 700 further includes a network interface 740 coupled to I/O interface 770.

In various embodiments, computing device 700 may be a uniprocessor system including one processor 710 or a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x76, PowerPC, SPARC, or MIPS ISAs, or any other suitable ISA. In multiprocessor systems, each of processors 710 may commonly, but not necessarily, implement the same ISA.

System memory 720 may be configured to store instructions and data accessible by processor(s) 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 720 as code 725 and data 726.

In one embodiment, I/O interface 770 may be configured to coordinate I/O traffic between the processor 710, system memory 720, and any peripheral devices in the device, including network interface 740 or other peripheral interfaces. In some embodiments, I/O interface 770 may perform any necessary protocol, timing, or other data transformations to convert data signals from one component (e.g., system memory 720) into a format suitable for use by another component (e.g., processor 710). In some embodiments, I/O interface 770 may include support for devices attached through various types of peripheral buses, such as a variant of the Peripheral Component Interconnect (PCI) bus standard or the Universal Serial Bus (USB) standard, for example. In some embodiments, the function of I/O interface 770 may be split into two or more separate components. Also, in some embodiments some or all of the functionality of I/O interface 770, such as an interface to system memory 720, may be incorporated directly into processor 710.

Network interface 740 may be configured to allow data to be exchanged between computing device 700 and other device or devices 760 attached to a network or network(s) 750, such as other computer systems or devices as illustrated in FIGS. 1 through 4, for example. In various embodiments, network interface 740 may support communication via any suitable wired or wireless general data networks, such as types of Ethernet networks, for example. Additionally, network interface 740 may support communication via telecommunications/telephony networks such as analog voice networks or digital fiber communications networks, via storage area networks such as Fibre Channel SANs or via any other suitable type of network and/or protocol.

In some embodiments, system memory 720 may be one embodiment of a computer-accessible medium configured to store program instructions and data as described above for FIGS. 1-6 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 700 via I/O interface 770. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 700 as system memory 720 or another type of memory. Further, a computer-accessible medium may include transmission media or signals such as electrical, electromagnetic or digital signals, conveyed via a communication medium such as a network and/or a wireless link, such as may be implemented via network interface 740. Portions or all of multiple computing devices, such as those illustrated in FIG. 7, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 7, may include other components that are not explicitly shown in FIG. 7, or may utilize an architecture completely different than that shown in FIG. 7.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computer-implemented method for configuring network devices in a computing network of a cloud computing environment, the computing network comprising a plurality of computing devices hosting virtual machines and a plurality of the network devices, the network devices communicatively coupled to the computing devices, the method comprising:
   collecting usage data indicative of usage of computing resources in the computing network during a selected time interval;
   based on the collected usage data, determining a time-based usage profile for the computing resources in the computing network during the selected time interval, the time-based usage profile having a trend component indicative of a trend of the computing resource usage over time and a periodic component indicative of predictable changes associated with the computing resource usage over a time period;
   identifying the periodic component in the time-based usage profile;
   based on the periodic component, generating a predicted time-based usage profile for the computing resources in the computing network;
   based on the predicted time-based usage profile, identifying future time intervals during which a performance threshold for the computing resources will not be met;
   dynamically adjusting a buffer size of the network devices in order for the network devices to support the performance threshold during the identified time intervals; and
   migrating one or more virtual machines to a host with sufficient computing resources to accommodate the predicted time-based usage profile.

2. The method of claim 1, wherein the predicted time-based usage profile is further generated based on a system-wide model and a localized model.

3. The method of claim 1, wherein the usage data comprises performance counters.

4. The method of claim 1, further comprising generating a notification when the periodic component is identified.

5. The method of claim 1, wherein the periodic component is identified using a machine learning model.

6. The method of claim 3, wherein the performance counters comprise one or more of network interface bytes received/sec, network interface bytes sent/sec, low resource receive indications/sec, low resource received packets/sec, or segments retransmitted/sec.

7. The method of claim 1, wherein the periodic component is determined over a selected hour/day or day/week.

8. A system, comprising:
   one or more processors; and
   a memory in communication with the one or more processors, the memory having computer-readable instructions stored thereupon that, when executed by the one or more processors, cause the system to perform operations comprising:
   collecting, during a selected time interval, usage data indicative of computing resource usage in a computing network comprising a plurality of computing devices hosting virtual machines and a plurality of network devices communicatively coupled to the computing devices;
   based on the collected usage data, determining a time-based usage profile for the computing resources in the computing network during the selected time interval;
   identifying a periodic component in the time-based usage profile, the periodic component indicative of predictable changes associated with the computing resource usage over a time period;
   based on the periodic component, generating a predicted time-based usage profile for a future time interval;
   based on the predicted time-based usage profile, identifying future time intervals during which a performance threshold for the computing resources will not be met;
   dynamically adjusting a buffer size of the network devices in order for the network devices to support the performance threshold during the identified time intervals; and
   migrating one or more virtual machines to a host with sufficient computing resources to accommodate the predicted time-based usage profile.

9. The system of claim 8, wherein the usage data comprises performance counters.

10. The system of claim 9, wherein the performance counters comprise one or more of network interface bytes received/sec, network interface bytes sent/sec, low resource receive indications/sec, low resource received packets/sec, or segments retransmitted/sec.

11. The system of claim 8, wherein the periodic component is identified by a machine learning model.

12. The system of claim 11, wherein the machine learning model comprises a trend component.

13. The system of claim 8, wherein the periodic component is determined over a selected hour/day or day/week.

14. The system of claim 8, further comprising computer-readable instructions stored thereupon that, when executed by the one or more processors, cause the system to perform operations comprising generating a notification when the periodic component is identified.

15. A computer-readable storage medium having computer-executable instructions stored thereupon which, when executed by one or more processors of a computing device, cause the computing device to perform operations comprising:
   collecting, during a selected time interval, usage data indicative of computing resource usage in a computing network comprising a plurality of computing devices hosting virtual machines and a plurality of network devices communicatively coupled to the computing devices;
   based on the collected usage data, determining a time-based usage profile for the computing resources in the computing network during the selected time interval;
   identifying a periodic component in the time-based usage profile, the periodic component indicative of predictable changes associated with the computing resource usage over a time period;
   based on the periodic component, generating a predicted time-based usage profile for a future time interval;

based on the predicted time-based usage profile, identifying future time intervals during which a performance threshold for the computing resources will not be met;

dynamically adjusting a buffer size of the network devices in order for the network devices to support the performance threshold during the identified time intervals; and migrating one or more virtual machines to a host with sufficient computing resources to accommodate the predicted time-based usage profile.

16. The computer-readable storage medium of claim 15, wherein the usage data comprises performance counters comprising one or more of network interface bytes received/sec, network interface bytes sent/sec, low resource receive indications/sec, low resource received packets/sec, or segments retransmitted/sec.

17. The computer-readable storage medium of claim 15, further comprising computer-readable instructions that, when executed by the one or more processors, cause the computing device to perform operations comprising generating a notification when the periodic component is identified.

18. The computer-readable storage medium of claim 15, wherein the periodic component is identified by a machine learning model and determined over a selected hour/day or day/week.

19. The computer-readable storage medium of claim 15, wherein the periodic component is identified by a machine learning model and the machine learning model comprises a trend component.

* * * * *

UNITED STATES PATENT AND TRADEMARK OFFICE
CERTIFICATE OF CORRECTION

| | | |
|---|---|---|
| PATENT NO. | : 11,997,159 B2 | |
| APPLICATION NO. | : 17/131681 | |
| DATED | : May 28, 2024 | |
| INVENTOR(S) | : Daniel Frederick Cuomo, Jr., Harish Srinivasan and Anirban Paul | |

It is certified that error appears in the above-identified patent and that said Letters Patent is hereby corrected as shown below:

On the Title Page

Item (72) Inventor delete "Paul ANIRBAN" and insert -- Anirban PAUL --.

Signed and Sealed this
First Day of October, 2024

Katherine Kelly Vidal
*Director of the United States Patent and Trademark Office*